(No Model.)
W. ZIMMERMAN.
RAILWAY SEMAPHORE.
No. 254,426. Patented Feb. 28, 1882.
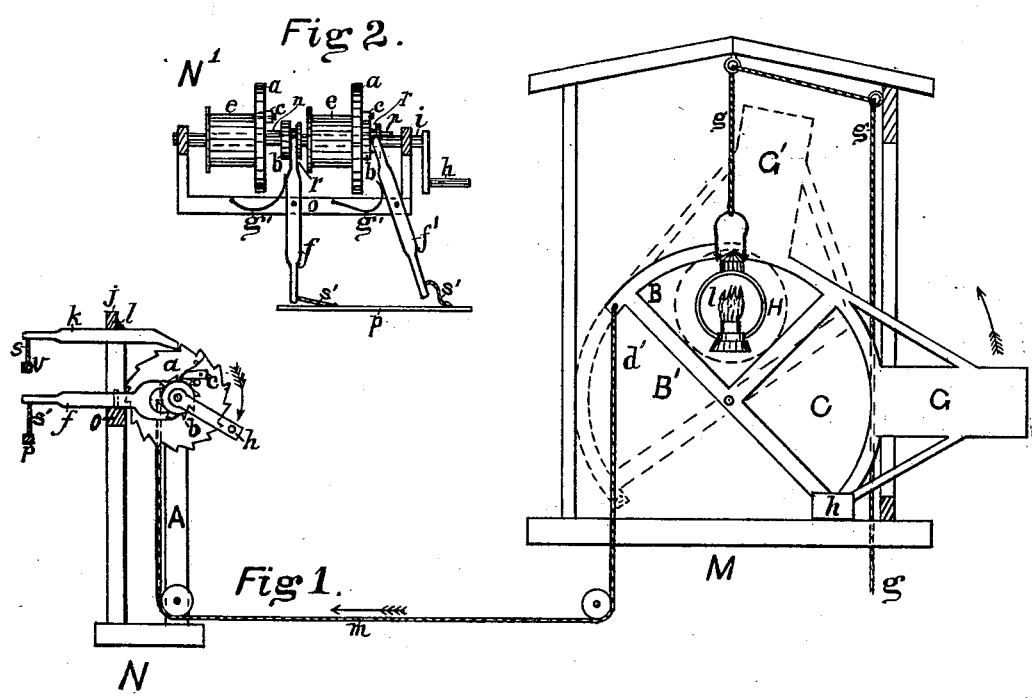
Witnesses
William R. Worrall
C. W. Robert
Inventor.
William Zimmerman

UNITED STATES PATENT OFFICE.

WILLIAM ZIMMERMAN, OF CHICAGO, ILLINOIS.

RAILWAY-SEMAPHORE.

SPECIFICATION forming part of Letters Patent No. 254,426, dated February 28, 1882.

Application filed August 15, 1881. (No model.)

*To all whom it may concern:*

Be it known that I, WILLIAM ZIMMERMAN, of Chicago, in the county of Cook and State of Illinois, have invented certain new and useful Improvements in Railway-Semaphores; and I hereby declare the following to be a full, clear, and exact description thereof, which will enable others skilled in the art to which my invention appertains to make and use the same, reference being had to the accompanying drawings, forming a part hereof, and in which—

Figure 1 represents a side view of the entire apparatus; Fig. 2, a plan view of the part N with the levers $k$ removed, and Fig. 3 a modification of the same.

Like letters of reference indicate like parts.

My improved semaphore belongs to that class in which the normal position of its several parts is so arranged as always to indicate "danger," unless specially otherwise placed or set; and it consists in operating and holding a series of colored signal boards or lights, or signal-boards to which are attached colored screens operated, in combination with a light, by means of wire strands kept in a taut or strained condition by means of mechanical devices, as hereinafter more fully described and claimed.

In the drawings, A represents a frame-work, upon which is mounted a shaft, $i$, provided with a winch, $h$, and feathers $n$, upon which slide the clutches $r$. Said clutches $r$ are, as here shown, preferably provided with ratchet-teeth on their peripheries, which engage with a pawl, $c$, attached to the side of a wheel, $a$. The wheel $a$ is also provided with ratchets, but pointing in the opposite direction to those of the wheel $b$, and is firmly attached to a drum, $e$, as is also the ratchet-wheel $b$ to the clutch $r$. The levers $f$, which operate the clutches $r$, are pivoted on the support $o$, upon which also are attached the springs $g'$, which press against said levers.

To a cross-bar, $j$, are attached, by means of a hinge at $l$, levers $k$, which act as pawls on the ratchet-wheels $a$, and to each drum $e$ is attached a rope, $m$, connecting the signal apparatus M with the mechanism N. The part M is such as is shown and described in Letters Patent to F. B. Aspinwall, and numbered 221,267, November 4, 1879.

The levers $f f$ are shown connected to a rod, $p$, by means of short ropes $s'$, and the levers $k$ are also attached to a rod, $v$, by cords $s$.

The operation of my improved semaphore apparatus is as follows: When it is desired to remove any one or all danger-signals the levers $f$ are each individually or all simultaneously pulled into the position $f'$ by pulling on the rod $p$, thereby engaging the ratchet-wheel or clutch $b$ with pawl $c$, and then turning the winch $h$ will cause the wheel $a$ and its attached drum $e$ to turn, as shown by the arrow, and wind the rope $m$ on the drum $e$, and thereby raise and hold the signal G in the position $G'$, the ratchet $k$ holding the signal G by means of the taut rope $m$, as shown in Fig. 1. The levers $f f'$, when released, are thrown into the position shown at $f$ by the force of the spring $g'$, thus leaving each wheel $a$ and drum $e$ held in place by the ratchet $k$. When it is desired to give any particular signal the lever $k$ corresponding to that desired signal is disengaged from the ratchets of the wheel $a$, when the board $G'$ will instantly fall into the position G, indicating "danger," and in which it will remain until again wound up, as before described. It will be observed that by this arrangement any one of a series or any number of signal-boards may be wound up from or dropped into the "danger" position with equal facility; also, that the danger signals by this arrangement are given with the greatest possible speed instantly, either by design or accidentally, as when the rope $m$ or any part of the winding apparatus breaks, so that danger-signals are always given until their cause is ascertained and removed.

Lever L, Fig. 3, is pivoted at $q$, and held in its place by a pin, $t$, in which, as shown, the rope or strand $m$ is taut, and when a danger-signal is to be given is thrown into the position $L'$.

From the preceding description and arrangement of the operating parts it will be observed that the rope $m$ in its normal condition is slack, and when the signal is at "all right" it is taut, the condition of the ropes, in connection with that of the signal-boards, being the reverse of those in general use. The rope $m$ and drums and levers connected to a certain signal, G, are made of the same color as that of the signal G, for obvious reasons.

I claim—

1. A signal apparatus, M, in combination with an operating apparatus, N, consisting of a drum, e, clutch r, lever f, rope m, and feathered shaft i, operating substantially as specified.

2. The shaft i, provided with feathers n and clutches r, operated by levers f, in combination with the drum e, ratchet-wheel a, pawl k, rope m, and signal apparatus M, substantially as specified.

3. The feathered shaft i, provided with clutch r, operated by lever f, spring g', rod p, and cord s', in combination with drum e, ratchet-wheel a, and pawls k and c, substantially as specified.

4. The combination of the drum e, ratchet-wheel a, pawl k, rod v, and cords s, substantially as specified.

5. In combination with a signaling apparatus consisting of a housing having an end opening, into and out of which pass colored signal-boards, and side openings to expose an interior light for the purpose of bringing before it screens attached to and forming a part of the signal-boards, and of the same color, arranged to fall automatically, the strand, and mechanism, substantially such as herein described, connected therewith, whereby said signals are held out of "danger," and by means of which any one or number of signals may be dropped into or removed from the position of "danger," and in which, by the breaking of said operating apparatus, the signal boards and lights will indicate "danger," all constructed to operate substantially as and for the purpose specified.

WILLIAM ZIMMERMAN.

Witnesses:
WILLIAM R. WORRALL,
C. W. ROBERTS.